United States Patent [19]
Yeh et al.

[11] Patent Number: 5,416,709
[45] Date of Patent: May 16, 1995

[54] FUZZY CONTROLLER FOR ANTI-SKID BRAKE SYSTEMS

[75] Inventors: Edge C. Yeh, Hsinchu; G. K. Roan; J. H. Ton, both of Tao-Yuan, all of Taiwan, Prov. of China

[73] Assignee: National Science Council, Taipei, Taiwan, Prov. of China

[21] Appl. No.: 145,501

[22] Filed: Nov. 3, 1993

[51] Int. Cl.$^6$ ................................................ B60T 8/60
[52] U.S. Cl. ......................... 364/426.02; 364/426.01; 303/95; 303/100; 395/900
[58] Field of Search ...................... 364/426.01, 426.02; 303/95, 96, 100, 102, 106, 111, 110; 395/900, 905

[56] References Cited

U.S. PATENT DOCUMENTS

| | | | |
|---|---|---|---|
| 3,857,613 | 12/1974 | Arikawa | 303/21 BE |
| 4,363,523 | 12/1982 | Mattori et al. | 303/92 |
| 4,826,258 | 5/1989 | Ocvirk et al. | 303/119 |
| 4,835,695 | 5/1989 | Walenty et al. | 364/426.02 |
| 4,924,394 | 5/1990 | Uchida et al. | 364/426.02 |
| 4,984,164 | 1/1991 | Maehara et al. | 364/426.02 |
| 5,051,907 | 9/1991 | Kuwana et al. | 364/426.02 |
| 5,063,514 | 11/1991 | Headley et al. | 364/426.02 |
| 5,245,695 | 9/1993 | Basehore | 395/3 |
| 5,276,620 | 1/1994 | Bottesch | 364/424.05 |

OTHER PUBLICATIONS

"Development of Fuzzy Controller for Anti-Skid Brake Systems with a Single Chip Microcontroller," E. C. Yeh, J. H. Ton & G. K. Roan, National Tsing Hua University, Taiwan, R.O.C., no date.

Primary Examiner—Kevin J. Teska
Assistant Examiner—Susan Wieland
Attorney, Agent, or Firm—Michael D. Bednarek; Marks & Murase

[57] ABSTRACT

A fuzzy controller for Anti-Skid Brake System which utilizes fuzzy rules to avoid skidding and spinning of a vehicle during braking. The fuzzy controller includes: a solenoid valve installed in the brake device disposed on a wheel of the vehicle, capable of adjusting the brake torque exerted on the wheel; a sensor disposed on the wheel of the vehicle, for sensing dynamic states of the wheel in a real time manner and subsequently sending the dynamic states out of the wheel; a CPU coupled to the sensor, for processing data concerning the dynamic states coming from the sensor and sending the processed dynamic states data out; a fuzzy calculation circuit coupled to the CPU and provided with fuzzy rules stored therein, for receiving processed dynamic states data from the CPU and calculating the processed dynamic states data based on fuzzy rules stored therein and subsequently feeding calculated results back to the CPU so as to enable the CPU to send driving signals out in accordance with the calculated results; and a driving circuit coupled to the CPU and the solenoid valve, for receiving driving signals from the CPU and driving the solenoid valve to adjust the brake torque exerted on the wheel to obtain maximum largest frictional force between the wheel and the road during braking.

4 Claims, 9 Drawing Sheets

Mode=INC

| $\bar{\omega}$\\$\dot{\omega}$ | NB | NS | ZO | PS | PB |
|---|---|---|---|---|---|
| NB | SLD | SLD | ADH | | ADH |
| NS | SLD | | ADH | | ADH |
| ZO | SLD | | ADH | | ADH |
| PS | SLD | | ADH | | ADH |
| PB | SLD | | ADH | | ADH |

FIG. 5A

Mode=DEC

| $\bar{\omega}$\\$\dot{\omega}$ | NB | NS | ZO | PS | PB |
|---|---|---|---|---|---|
| NB | SLD | | SLD | | ADH |
| NS | SLD | | SLD | | ADH |
| ZO | SLD | | SLD | | ADH |
| PS | SLD | | SLD | MID | ADH |
| PB | SLD | | SLD | | ADH |

FIG. 5B

Mode=HLD

| $\bar{\omega}$\\$\dot{\omega}$ | NB | NS | ZO | PS | PB |
|---|---|---|---|---|---|
| NB | | | | | |
| NS | | | | | |
| ZO | | | ADH | | |
| PS | | | | MID | |
| PB | | | | | |

FUZZY CONTROLLER FOR ANTI-SKID BRAKE SYSTEMS

BACKGROUND OF THE INVENTION

The present invention relates to a fuzzy controller for Anti-Skid Brake Systems (hereinafter referred as ABS), and particularly to a fuzzy controller which is capable of making various states of a vehicle fuzzy or indistinct so as to facilitate the fuzzy ABS control of a vehicle.

Most car drivers believe that they are capable of putting a full stop to a car in a short distance if they fully depress the brake-pedal. However, many experiments show that although fully depressing the brake-pedal will apply a large brake torque to car wheels, this will result in the locking of car wheels. Locking of car wheels will inevitably cause skidding and spinning of the car and accidents will thus happen.

When locked during braking, car wheels skid on the road and spinning occurs. If car wheels keep rolling with low slip ratio on the road during braking, static friction occurs between car wheels and the road. That is due to the fact that the point of the car wheel which contacts the ground will stay still relative to the ground at the instant of contact. In other words, no slip occurs between the car wheels and the road, if the car wheels are rolling (rather than skidding) during braking. As people skilled in this art know, dynamic friction coefficients are smaller than static friction coefficients. Thus keeping car wheels rolling during braking will result in larger frictional forces between the car wheels and the road. Furthermore, if car wheels keep rolling during braking, the car tends to move in the direction of the rolling wheels, and the driver is thus capable of steering the car in his/her own way during braking. If car wheels are locked during braking, car wheels will slip and move without regard to the direction of the wheels. Thus the car will spin out of control. Therefore, more and more cars are equipped with ABS which are provided with sensors for sensing tire speeds and inputting the speed data to a CPU installed within the system so as to assist the driver in preserving braking control.

There are presently many patents relating to ABS. These patents concern: structures for ABS, methods for controlling ABS, monitoring systems for ABS, . . . etc. Methods for controlling ABS can be divided into the following two categories:

The first category includes methods for monitoring the dynamic states (such as: angular speeds of car wheels, angular acceleration of car wheels, and slip differences between car wheels) of a car, methods for determining whether car wheels are locked or not, and methods for preventing the skidding of a car. The above-described methods are disclosed in U.S. Pat. Nos. 3,857,613, 4,363,523, 48,262,581, 4,835,695, 4,924,394, 5,063,514, 4,984,164, and 5,051,907. Among the above-described patents, the '613 patent disclosed an electric ABS, the '523 patent disclosed a structure for ABS, the '581 patent and the '695 patent disclosed a method for avoiding the skidding by monitoring the slip differences between each of the car wheels, the '394 patent suggested choosing the highest wheel speed as the speed of the car and calculating slip differences between each of car wheels and the speed of the car to prevent skidding, the '514 patent proposed use of slip differences as feedback signals and prevention of skidding by setting two threshold values for slip differences, the '165 patent proposed to use the tire speeds as feedback signals and by setting two critical values for tire speeds to prevent skidding, the '907 patent disclosed a method for preventing the locking of car wheels by monitoring the angular speeds of tires and controlling solenoid valves so as to decrease or increase the pressure exerted on brake linings.

The second category involves taking the friction coefficient between tires and the road into consideration and controlling the ABS precisely by sending appropriate commands into the system. The above-described methods are disclosed in U.S. Pat. Nos. 4,755,945, 4,836,616, 4,936,636, 4,991,103, and 5,058,018. Among the above-described patents, the '945 patent and the '616 patent proposed using a microprocessor for monitoring the variation of wheel speeds so as to determine whether the wheels are rolling on a high or low friction road and to control the ABS properly. The '636 patent, the '103 patent and the '818 patent disclosed methods similar to that of the '616 patent.

However, the above-described patents utilize a two value logic system in which only two values $<$true$>$ and $<$false$>$ are recognized. However, the real state of the car can not be distinctively divided into only two values. Thus, the above-described systems are not suitable for real-life applications.

SUMMARY OF THE INVENTION

The object of this invention is to provide a fuzzy controller for an ABS, which drives solenoid valves installed in the brake mechanism of the ABS so as to control the rolling motion of car wheels.

The fuzzy controller for the ABS of this invention includes a solenoid valve installed in the brake device capable of adjusting the brake torque exerted on the wheel; a sensor disposed on the wheel of the vehicle to sense the dynamic states of the wheel in a real time manner and subsequently send data about the dynamic states out of the wheel; a CPU coupled to the sensor, for processing the data concerning the dynamic states coming from the sensor and sending the processed data about the dynamic states out; a fuzzy calculation circuit coupled to the CPU and provided with fuzzy rules stored therein, for receiving the processed data about the dynamic states from the CPU and calculating the CPU-processed dynamic states based on fuzzy rules stored therein and subsequently feeding the calculated results back to the CPU so as to enable the CPU to send driving signals out in accordance with the calculated results; and a driving circuit coupled to the CPU and the solenoid valve, for receiving driving signals from the CPU and driving the solenoid valve to adjust the brake torque exerted on the wheel to obtain the largest frictional force between the wheel and the road during braking.

The fuzzy controller according to this invention utilizes a fuzzy control algorithm (see Development of Fuzzy Controller for Anti-Skid Brake Systems with a Single Chip Microcontroller disclosed in Intelligent Vehicles '93 Symposium, Jul. 14–16, 1993, Tokyo, hereinafter referred as Ref. 1). In other words, each state of the car is distributed or fuzzified so as to maintain the brake torque in its proper value range. By this, the braking distance can be minimized and skidding or spinning of the car can be avoided.

BRIEF DESCRIPTION OF THE ACCOMPANYING DRAWINGS

In order to clearly explain the nature of this invention, a detailed description of a preferred embodiment will be made below with accompanying drawings, wherein.

DETAILED DESCRIPTION OF THE INVENTION

The actual details of how braking systems work are complex and the dynamic behavior of an ABS is still difficult to describe precisely. As is well known, fuzzy control is nonlinear, and with the help of human intuition, the complex phenomena of braking may be reduced to some simple rules based on physical insight to yield the desired characteristics of system behavior. In this invention, an ABS controller is developed by using the fuzzy logic concept.

In order to implement the fuzzy control algorithm, a single chip microprocessor, for example, an Intel 80C196KC microprocessor is used together with a fuzzy chip, for example, a Togai FC110 fuzzy chip. The microprocessor is used to process feedback signals from wheel speed sensors and to control solenoid valves in the brake system. The fuzzy chip is used to enhance the fuzzy inference speed. The microprocessor is coupled with the fuzzy chip in which fuzzy rules and membership functions (see Ref. 1) are stored to provide the fuzzy knowledge base. The fuzzy variables are wheel angular velocity, angular acceleration, pressure mode, and tire force. The microprocessor acts as the host and the fuzzy chip the slave. Because an 8-bit data bus is used for the output and input port of the fuzzy chip, the microprocessor is set to work in an 8-bit mode. Pressure commands are sent out by way of the output port of the microprocessor to control solenoid valves of the brake system. A real-time simulator can be coupled to the brake system so as to test the hardware and software of the fuzzy ABS controller under various simulated road conditions.

There are three slip regions (modes) of a tire, namely the adhesion region, the middle region and the sliding region. In the adhesion region, the slip (relative speed between the tire and the ground) is small and the tire force is generated by the adhesion effect. In the sliding region, the tire force is decreasing due to the sliding effect of the tire footprint. In the middle region between complete adhesion and complete sliding, the footprint is in partial adhesion and partial sliding mode. The object of the ABS is to control brake torque to maintain the slip in the middle region. The slip region which a tire is in is determined from its pressure mode, angular acceleration, and differentiation of angular acceleration. When the slip is in the middle region, the pressure is kept unchanged; when the slip is in the adhesion region, the pressure is increased; when the slip is in the sliding region, the pressure is decreased. The data (such as pressure, angular acceleration and differentiation of angular acceleration) are used to determine the current slip region of the tire.

Figure 1:
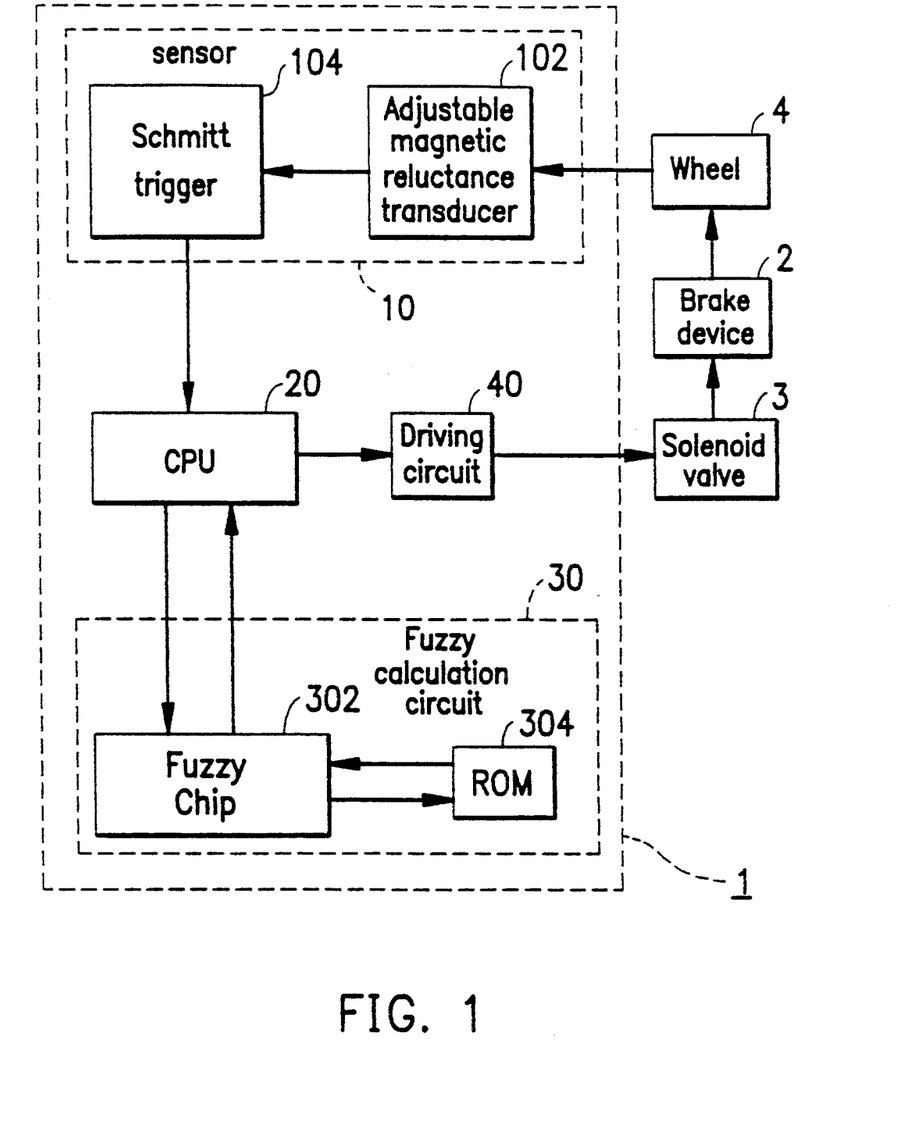
FIG. 1 is a block diagram showing the structure of the circuit installed in a preferred embodiment of the fuzzy controller according to this invention.

FIG. 1 is a block diagram showing the configuration of the circuit installed in a preferred embodiment of the fuzzy controller according to this invention. As shown in FIG. 1, the fuzzy controller 1 of this invention is adapted to drive a solenoid valve 3 installed in a brake device 2 so as to control the rolling of a wheel 4. The fuzzy controller 1 includes a speed sensor 10, a CPU 20, a fuzzy calculation circuit 30, and a driving circuit 40.

The speed sensor 10 is coupled to the wheel 4 so as to sense and transmit the speed of the wheel 4 to the CPU 20. The speed sensor 10 may be composed of an adjustable magnetic reluctance transducer 102 and a Schmitt trigger 104. The adjustable magnetic reluctance transducer 102 is disposed on the shaft of the wheel 4 so as to sense the angular velocity of the wheel 4, and the Schmitt trigger 104 transforms sinewave signals of the wheel angular velocity into square wave signals and transmits them to the CPU 20.

Figure 3:
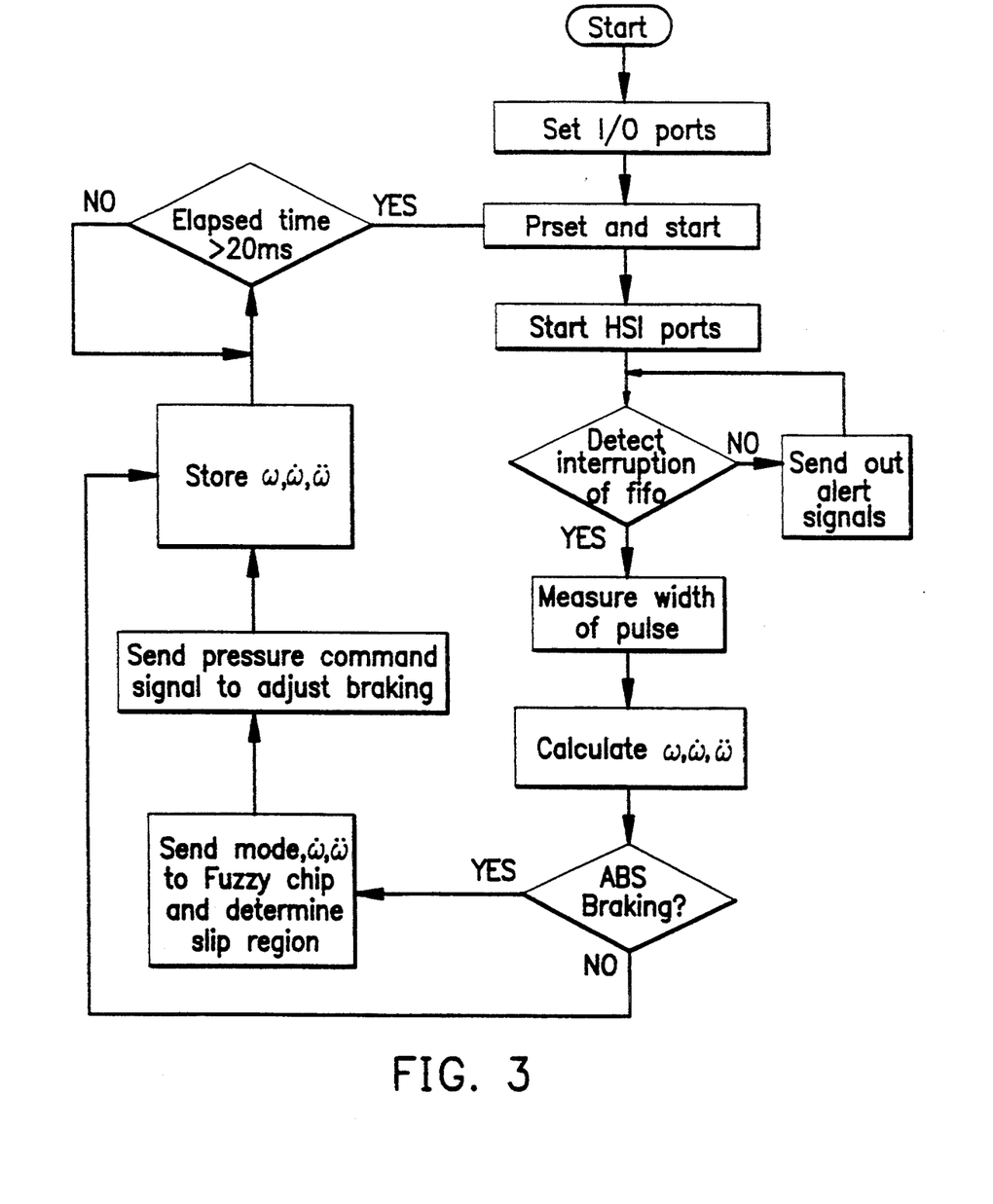
FIG. 3 is a flowchart showing the control program for the CPU installed in the fuzzy controller according to this invention.
Figure 4A:
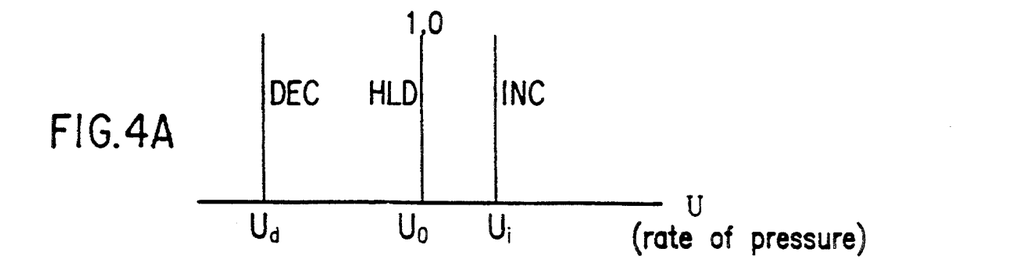
FIGS. 4a, 4b, 4c and 4d are graphs showing respectively the membership functions for fuzzy sets of the fuzzy calculation circuit installed in the fuzzy controller according to this invention.
Figure 4B:
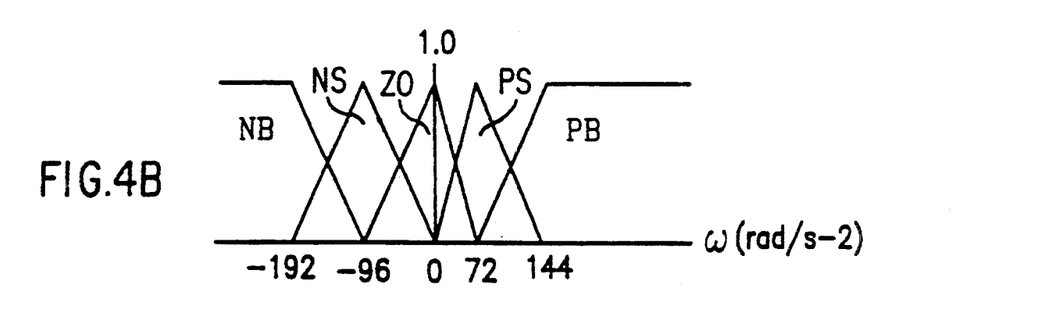
Figure 4C:
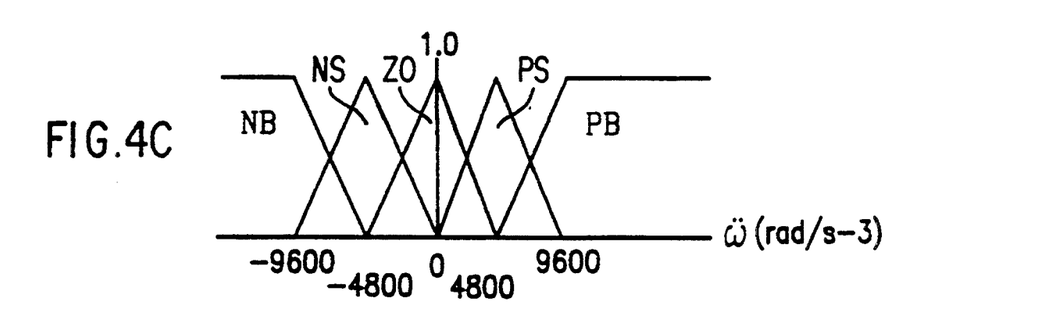
Figure 4D:
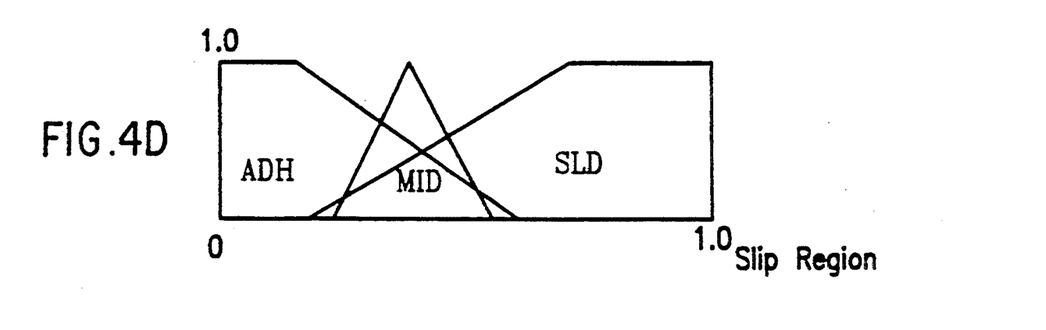

The CPU 20 coupled to the speed sensor 10 is used for processing the dynamic signals of the wheel 4 transmitted from the speed sensor 10 and sending them to the fuzzy calculation circuit 30. The CPU 20 may be an Intel 80C196KC chip. Four high speed input (HSI) terminals of the Intel 80C196KC chip receive angular velocity signals coming from four speed sensors 10 mounted respectively on each of the four wheels 4, and the Intel 80C196KC chip calculates the angular speed, angular acceleration, and differentiation of angular acceleration which are in turn transmitted to the fuzzy calculation circuit 30 by way of the ports 3 and 4 of the Intel 80C196KC chip. The flowchart of control program, stored in the CPU 20, for the above-described process is illustrated in FIG. 3.

Figure 5A:
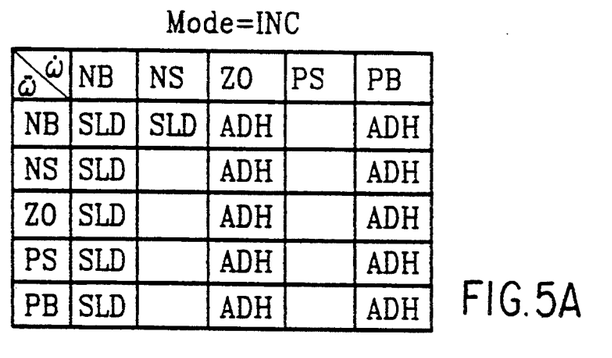
FIG. 5 is the fuzzy rule table for the fuzzy calculation circuit installed in the fuzzy controller according to this invention.
Figure 5B:
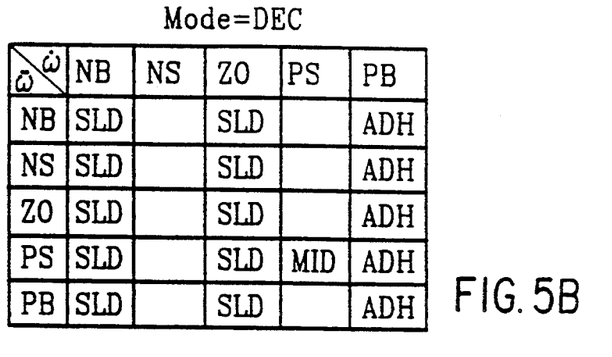
Figure 5C:
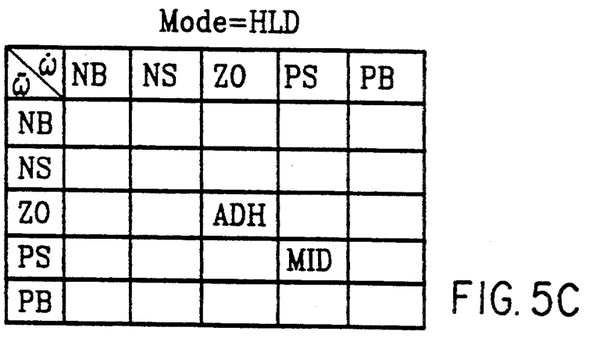

The fuzzy calculation circuit 30 coupled with the CPU 20 has fuzzy rules stored therein. The fuzzy calculation circuit 30 is deployed to receive dynamic signals from the CPU 20 and calculate them based on fuzzy rules stored therein, and finally the calculated result is fed back to the CPU 20. The CPU 20 will thus transmit output drive signals (such as increasing the pressure, decreasing the pressure, or holding the pressure) to a drive circuit 40 in accordance with the calculated result. The fuzzy calculation circuit 30 may be composed of a Togai FC110 chip 302 and a ROM 304 which is provided with membership functions for fuzzy sets (see Ref. 1 and FIG. 4) and a fuzzy rules table (see Ref.1 and FIG. 5) stored therein as a knowledge base for the Togai FC110 chip 302. The meaning of the symbols appearing in FIGS. 4 and 5 are as follows:

INC: Increase

Figure 2:
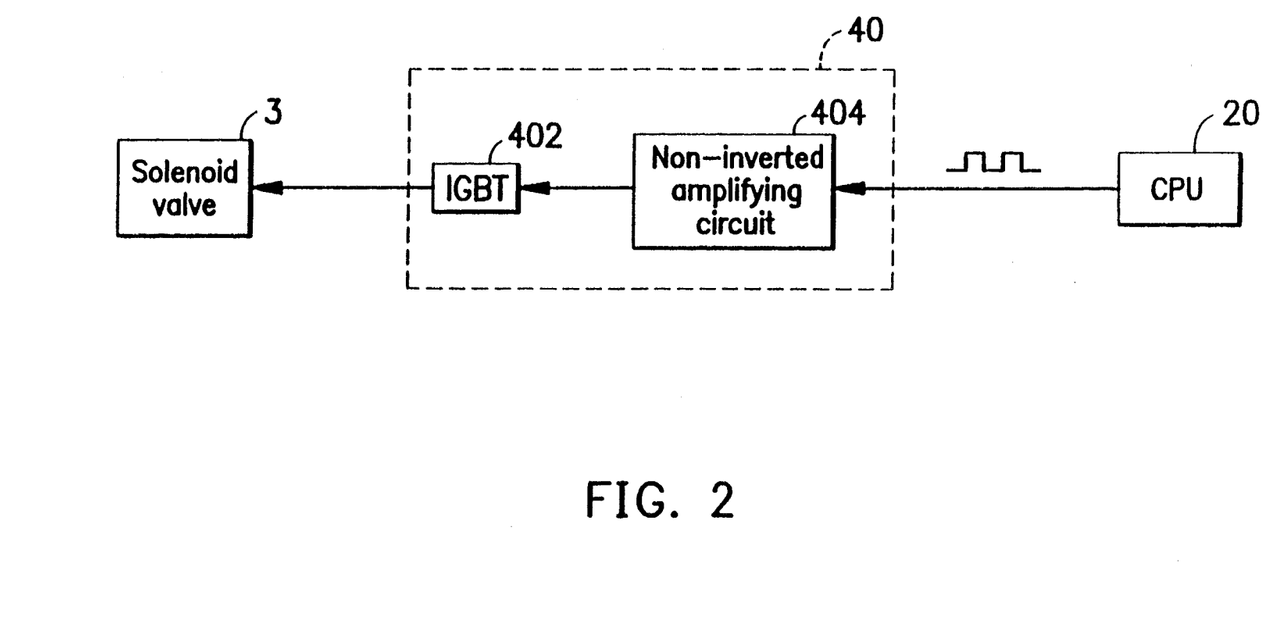
FIG. 2 is a block diagram showing the structure of the driving circuit in the fuzzy controller according to this invention.

HLD: Hold
DEC: Decrease
PB: Positive Big
PS: Positive small
ZO: Zero
NS: Negative Small
NB: Negative Big
ADH: Adhesion
MID: Middle
SLD: Sliding The fuzzy chip Togai FC110 302 receives dynamic signals from port 3 and port 4 of the Intel 80C196KC chip and does calculations in accordance with the membership functions for fuzzy sets and fuzzy value table stored in the ROM 304. Subsequently, the Togai FC110 chip 302 sends the results to port and port 4 of the Intel 80C196KC chip which will determine the pressure mode (increasing the pressure, decreasing the pressure, or holding the pressure) based on the calculation results and output command signals through port 1 to the driving circuit 40. The driving circuit 40 (see FIGS. 1 and 2) is coupled to the CPU 20 and the solenoid valves 3 so as to drive the solenoid valves 3 in accordance with output signals of the CPU 20 and control the wheels 4 by way of the brake device 2. The driving circuit 40 may be an IGBT 402 (Isolated Gate Bipolar Transistor) which is a power transistor for driving the solenoid valves 3. To trigger the IGBT 402, it is necessary to apply a bias voltage larger than 8 V to the gate of the IGBT 402. Therefore, transmitting signals between the IGBT 402 and the CPU 20 requires a non-inverted amplifying circuit 404.

Figure 6:
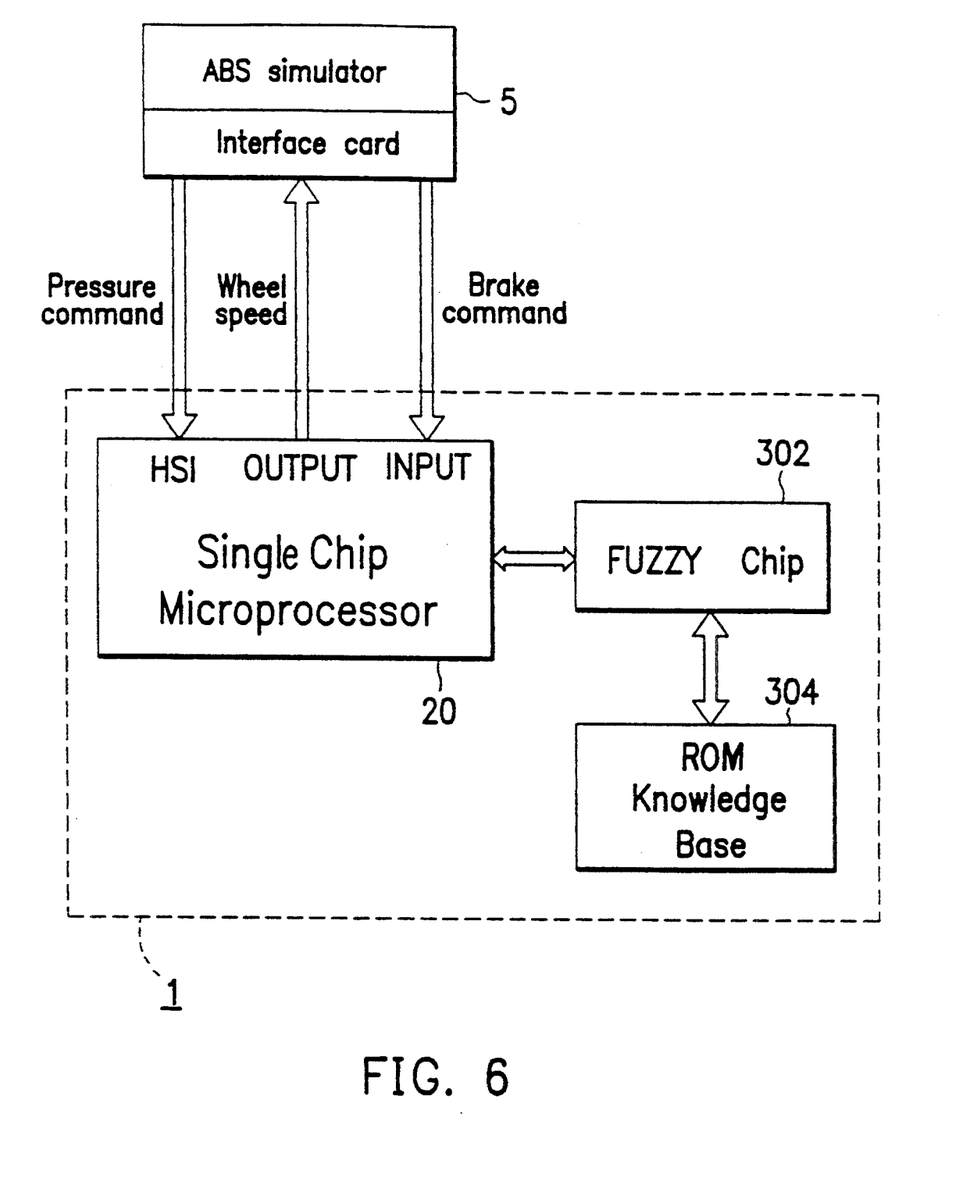
FIG. 6 is a schematic block diagram showing the coupling of the fuzzy controller of this invention and an ABS simulator in a loop simulation for ABS.
Figure 7:
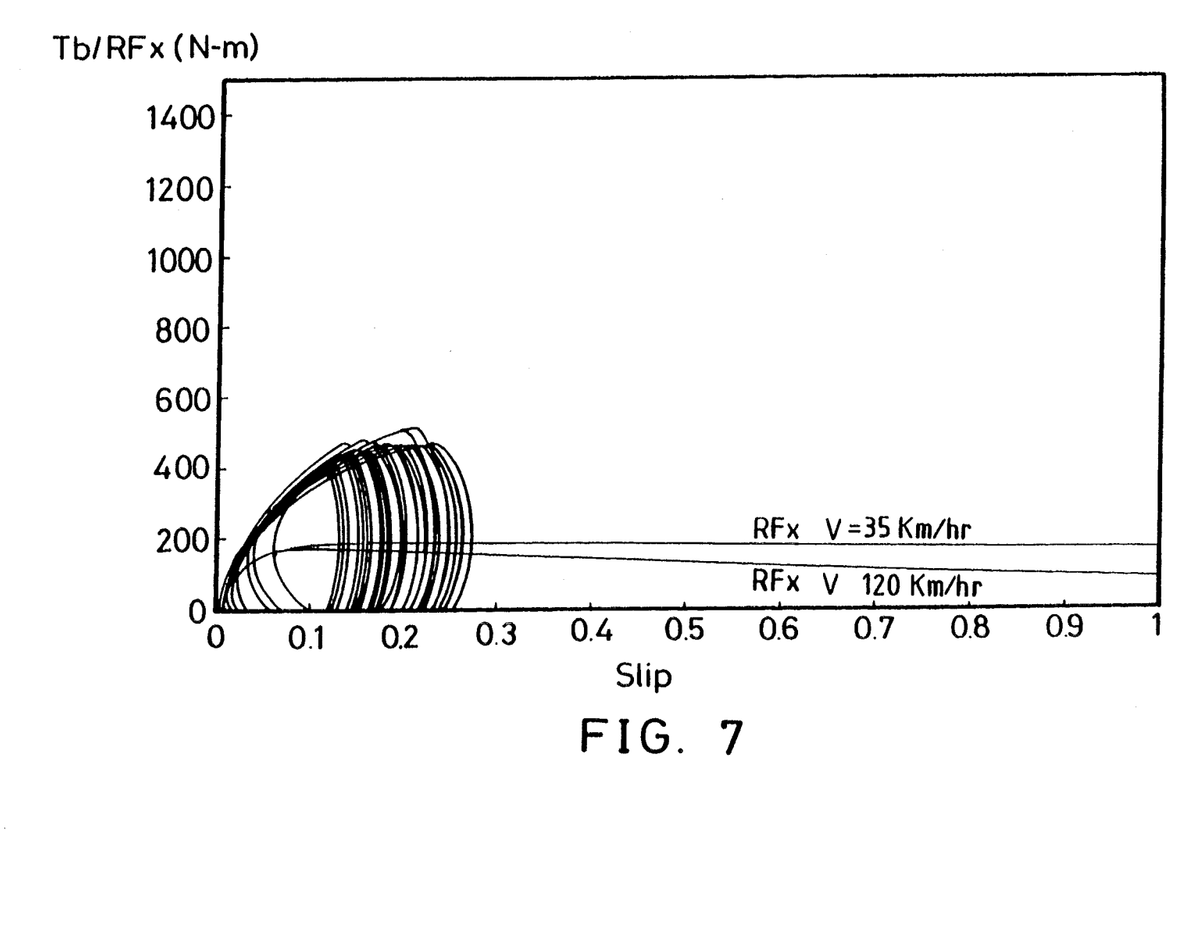
FIG. 7 is a graph showing the simulation result for icy roads.
Figure 8:
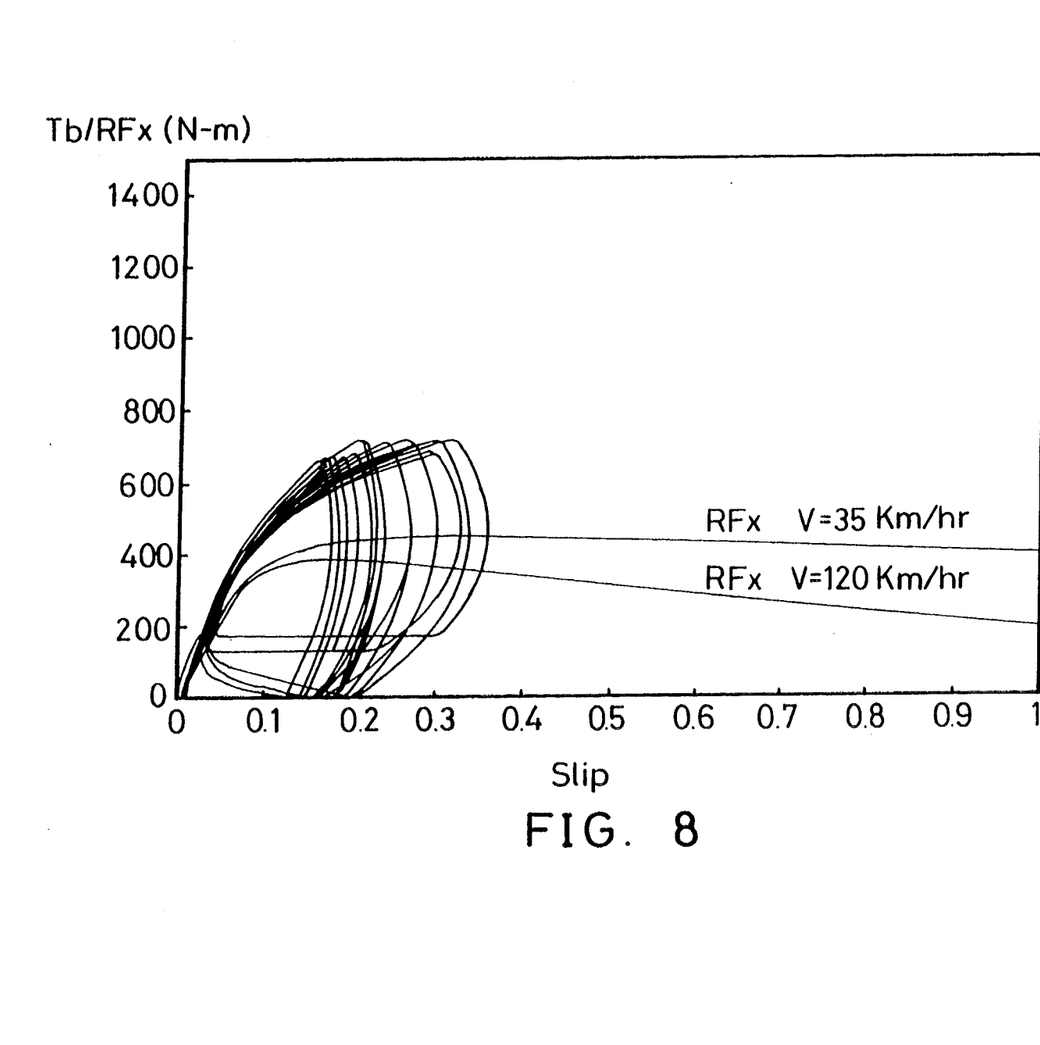
FIG. 8 is a graph showing the simulation result for wet roads.
Figure 9:
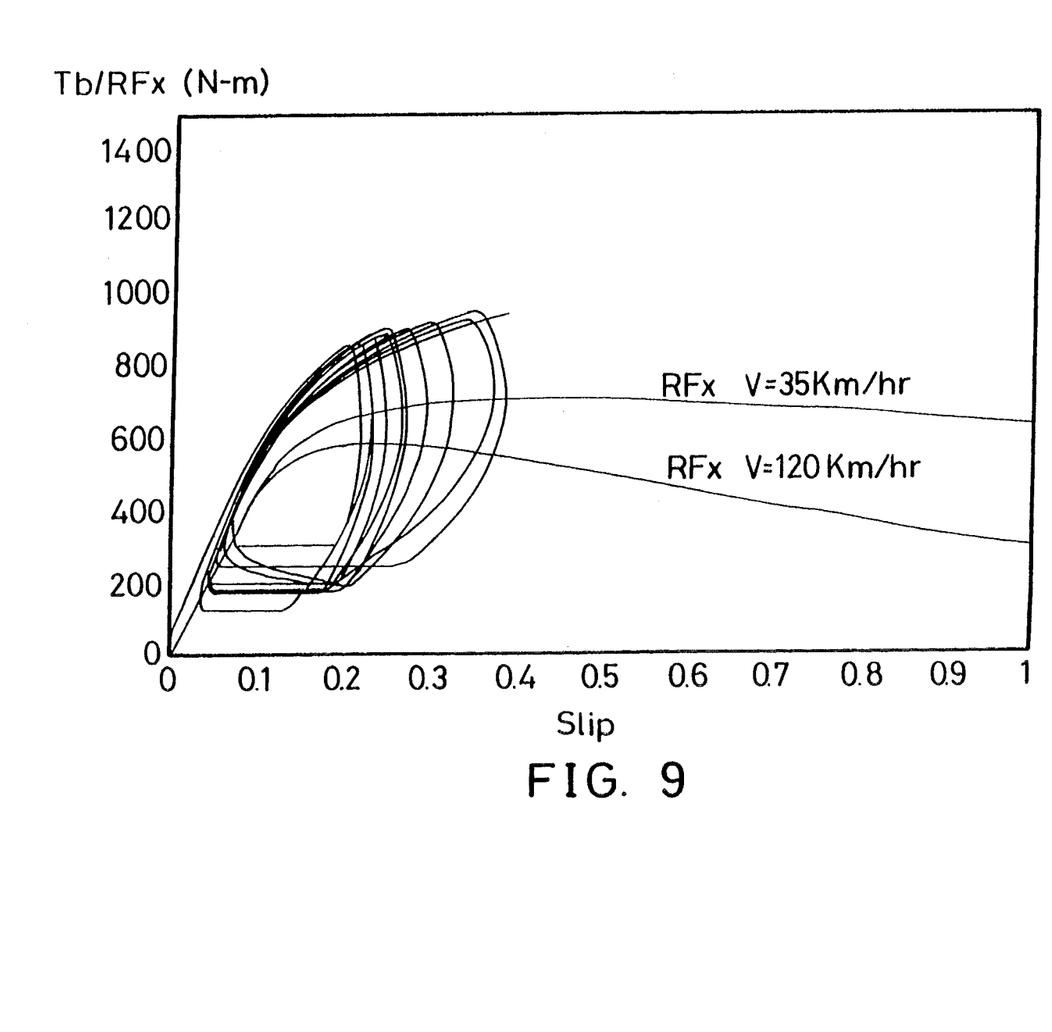
FIG. 9 is a graph showing the simulation result for dry roads.

As shown in FIG. 6, a real-time ABS simulator 5, which is a PC-386 (386 based personal computer) with a dedicated interface card coupled to an ABS controller, can be used to test the hardware and software of the ABS controller. The simulator 5 solves the differential equations of a vehicle, wheel and brake dynamics, based on the Dugoff tire model (see Ref. 1) to simulate the vehicle behavior under various road conditions. The results are displayed in real time on a screen of a monitor by four graphic windows displaying a Tb-FxS diagram and the trajectory for four wheels. Three road conditions (i.e. icy, wet, and dry) are used to test the fuzzy ABS controller while the vehicle speed is being braked from 102 Km/hr to 35 hr Km/hr. The results are shown in FIGS. 7, 8 and 9. As shown in FIGS. 7, 8 and 9, regardless of what road conditions prevail, the fuzzy ABS controller according to this invention can obtain a satisfactory result, that is, the wheels did not lock (S<0.4) and the brake torques were maintained at near maximum.

As described above, the fuzzy ABS controller of this invention can distribute and fuzzify each of the dynamic states of a vehicle so as to facilitate a satisfactory brake control. Since the wheels can be kept at maximum brake force torque, the vehicle can be fully braked within a short distance. Spinning or skidding caused by the locking wheels is thus avoidable.

The forgoing is a complete description of a preferred embodiment of the present invention. Numerous changes and modifications may be made without departing from the spirit and scope of the present invention.

What is claimed is:

1. A fuzzy controller for an Anti-Skid Brake System to control the braking of a vehicle based on a plurality of slip regions set, the vehicle being provided with a brake device which is disposed on one wheel of the vehicle and exerts brake torque on the wheel through hydraulic brake pressure during braking, the fuzzy controller comprising:
    a solenoid valve installed in the brake device, for changing the hydraulic brake pressure for adjusting the brake torque exerted on the wheel;
    a sensor disposed on the wheel of the vehicle, for sensing dynamic states of the wheel in a real time manner and subsequently sending the dynamic states out of the wheel;
    a CPU coupled to said sensor, for processing data concerning the dynamic states coming from said sensor and sending the processed data out;
    a fuzzy calculation circuit coupled to said CPU and provided with fuzzy rules stored therein to receive processed data about dynamic states from said CPU and calculate the processed dynamic states data based on fuzzy rules stored therein to determine the slip region which the wheel is in and subsequently feed calculated results back to said CPU so as to enable said CPU to send driving signals out in accordance with the calculated results; and
    a driving circuit coupled to said CPU and said solenoid valve, for receiving driving signals from said CPU and driving said solenoid valve so as to adjust the brake torque exerted on the wheel and obtain maximum frictional force between the wheel and the road during braking.

2. The fuzzy controller for an Anti-Skid Brake System as claimed in claim 1, wherein said CPU is an Intel 80C196KC single chip and said fuzzy calculation circuit is composed of a Togai FC110 fuzzy chip and a ROM with fuzzy rules stored therein.

3. The fuzzy controller for an Anti-Skid Brake System as claimed in claim 2, wherein the dynamic states of the wheel are the angular velocity of the wheel, the angular acceleration of the wheel, differentiation of the angular acceleration of the wheel, the hydraulic brake pressure exerted on the wheel, and slip regions.

4. The fuzzy controller for an Anti-Skid Brake System as claimed in claim 1, wherein the dynamic states of the wheel are the angular velocity of the wheel, the angular acceleration of the wheel, differentiation of the angular acceleration of the wheel, the hydraulic brake pressure exerted on the wheel, and slip regions.

\* \* \* \* \*

UNITED STATES PATENT AND TRADEMARK OFFICE
CERTIFICATE OF CORRECTION

PATENT NO. : 5,416,709
DATED : May 16, 1995
INVENTOR(S) : Edge C. Yeh, et al

It is certified that error appears in the above-indentified patent and that said Letters Patent is hereby corrected as shown below:

On the title page, item [73] Assignee: "Prov. of China" should read --Rep. of China--.

Signed and Sealed this

First Day of August, 1995

Attest:

BRUCE LEHMAN

Attesting Officer     Commissioner of Patents and Trademarks